United States Patent
Kathuria et al.

(10) Patent No.: US 10,129,689 B2
(45) Date of Patent: Nov. 13, 2018

(54) SYSTEMS AND METHODS FOR MACHINE-TYPE COMMUNICATION

(71) Applicant: DEFINITION NETWORKS, INC., Middleton, MA (US)

(72) Inventors: Vijay Kumar Kathuria, Middleton, MA (US); Kenneth Edward Virgile, Lexington, MA (US); Mahavir Dagdulal Karnavat, Maharashtra (IN); Harish Chintamani Ratnaparkhi, Pune (IN); Mukesh Kumar Singhal, Maharashtra (IN)

(73) Assignee: Definition Networks, Inc., Middleton, MA (US)

( * ) Notice: Subject to any disclaimer, the term of this patent is extended or adjusted under 35 U.S.C. 154(b) by 19 days.

(21) Appl. No.: 15/261,783

(22) Filed: Sep. 9, 2016

(65) Prior Publication Data

US 2017/0127218 A1     May 4, 2017

(30) Foreign Application Priority Data

Nov. 2, 2015  (IN) .......................... 3575/DEL/2015

(51) Int. Cl.
*H04W 4/00* (2018.01)
*H04W 4/14* (2009.01)
(Continued)

(52) U.S. Cl.
CPC ........... *H04W 4/005* (2013.01); *H04M 15/62* (2013.01); *H04M 15/66* (2013.01); *H04M 15/80* (2013.01);
(Continued)

(58) Field of Classification Search
CPC ....... H04W 4/005; H04W 4/14; H04W 12/06; H04W 12/08; H04W 28/0284;
(Continued)

(56) References Cited

U.S. PATENT DOCUMENTS

| | | |
|---|---|---|
| 8,559,299 B2 | 10/2013 | Bonnier et al. |
| 2011/0274042 A1 | 11/2011 | Diachina et al. |

(Continued)

FOREIGN PATENT DOCUMENTS

| | | |
|---|---|---|
| EP | 2 416 604 A1 | 2/2012 |
| EP | 2 509 357 A1 | 10/2012 |

(Continued)

OTHER PUBLICATIONS

De Foy et al., "Machine to Machine Communication for Smart Meters using Optimized 3GPP systems", InterDigital Communications, LLC, pp. 1-5 (Jan. 2010).

(Continued)

*Primary Examiner* — Duc C Ho
(74) *Attorney, Agent, or Firm* — Finnegan, Henderson, Farabow, Garrett & Dunner, LLP

(57) ABSTRACT

Systems and methods are provided for managing machine-type communication and for mobile network memory conservation. Consistent with disclosed embodiments, a machine-type communication gateway including a centralized policy engine and a device trigger storage may be communicatively connected to control nodes of a mobile network and to trigger providers of a fixed network. The machine-type communication gateway may be configured to receive device triggers from the trigger providers, store the device triggers in the device trigger storage in queues, and providing the device triggers to the control nodes at rates determined by the centralized policy engine. Consistent with disclosed embodiments, a non-transitory storage memory may store bearer information. The mobile network may be configured to receive an indication to establish a data session, retrieve the stored bearer information from the storage memory, and commit memory resources by estab- (Continued)

lishing one or more bearers for the data session using the stored bearer information.

28 Claims, 8 Drawing Sheets

(51) Int. Cl.
*H04M 15/00* (2006.01)
*H04W 4/70* (2018.01)
*H04W 88/16* (2009.01)

(52) U.S. Cl.
CPC ......... *H04M 15/8027* (2013.01); *H04W 4/14* (2013.01); *H04W 4/70* (2018.02); *H04W 88/16* (2013.01)

(58) Field of Classification Search
CPC ....... H04W 88/16; H04L 47/25; H04M 15/62; H04M 15/66; H04M 15/80; H04M 15/8027
See application file for complete search history.

(56) References Cited

U.S. PATENT DOCUMENTS

| | | |
|---|---|---|
| 2012/0033551 A1 | 2/2012 | Liao |
| 2012/0184205 A1 | 7/2012 | Luft et al. |
| 2012/0252518 A1 | 10/2012 | Karampatsis et al. |
| 2012/0257571 A1 | 10/2012 | Liao |
| 2012/0275348 A1* | 11/2012 | Zhou ................... H04L 12/14 370/259 |
| 2013/0051326 A1 | 2/2013 | Jeyatharan et al. |
| 2013/0182607 A1 | 7/2013 | Kim et al. |
| 2013/0336111 A1 | 12/2013 | Vos et al. |
| 2013/0339438 A1 | 12/2013 | Cherian et al. |
| 2014/0038549 A1 | 2/2014 | Lehane et al. |
| 2014/0056132 A1 | 2/2014 | Lim et al. |
| 2014/0092808 A1 | 3/2014 | Jain et al. |
| 2014/0112251 A1 | 4/2014 | Kim et al. |
| 2014/0134996 A1 | 5/2014 | Barclay et al. |
| 2014/0185522 A1 | 7/2014 | Xu |
| 2014/0194111 A1 | 7/2014 | Aso et al. |
| 2014/0242952 A1 | 8/2014 | Zhang et al. |
| 2014/0286162 A1 | 9/2014 | Kim et al. |
| 2014/0307632 A1 | 10/2014 | Kim et al. |
| 2014/0341041 A1 | 11/2014 | Velev et al. |
| 2014/0369326 A1 | 12/2014 | Wang et al. |
| 2015/0023234 A1 | 1/2015 | Ronneke et al. |
| 2015/0029845 A1 | 1/2015 | Jain et al. |
| 2015/0036492 A1 | 2/2015 | Jin et al. |
| 2015/0049610 A1 | 2/2015 | Kim et al. |
| 2015/0050955 A1 | 2/2015 | Kim et al. |
| 2015/0085658 A1 | 3/2015 | Hong et al. |
| 2015/0092547 A1 | 4/2015 | Wu et al. |
| 2015/0172882 A1* | 6/2015 | Hua ..................... H04W 4/14 455/466 |
| 2015/0327112 A1* | 11/2015 | Kant ................ H04W 28/0263 370/230 |
| 2016/0006815 A1* | 1/2016 | Dong ..................... G06F 9/46 709/204 |

FOREIGN PATENT DOCUMENTS

| | | |
|---|---|---|
| EP | 2 605 606 A2 | 6/2013 |
| EP | 2 608 567 A1 | 6/2013 |
| EP | 2 693 776 A1 | 2/2014 |
| EP | 2 693 777 A1 | 2/2014 |
| EP | 2 693 800 A1 | 2/2014 |
| EP | 2 750 422 A1 | 7/2014 |
| EP | 2 683 183 A1 | 8/2014 |
| EP | 2 843 921 A1 | 3/2015 |
| EP | 2 852 083 A1 | 3/2015 |
| EP | 2 852 210 A1 | 3/2015 |
| WO | WO 2002/093689 A1 | 11/2002 |
| WO | WO 2011/041979 A1 | 4/2011 |
| WO | WO 2011/154761 A1 | 12/2011 |
| WO | WO 2012/022096 A1 | 2/2012 |
| WO | WO 2012/062155 A1 | 5/2012 |
| WO | WO 2012/071888 A1 | 6/2012 |
| WO | WO 2012/111255 A1 | 8/2012 |
| WO | WO 2012/135582 A1 | 10/2012 |
| WO | WO 2012/136374 A2 | 10/2012 |
| WO | WO 2012/151981 A1 | 11/2012 |
| WO | WO 2013/001731 A1 | 1/2013 |
| WO | WO 2013/005938 A2 | 1/2013 |
| WO | WO 2013/061614 A2 | 5/2013 |
| WO | WO 2013/066350 A1 | 5/2013 |
| WO | WO 2013/067183 A1 | 5/2013 |
| WO | WO 2013/087403 A1 | 6/2013 |
| WO | WO 2013/090809 A1 | 6/2013 |
| WO | WO 2013/109087 A1 | 7/2013 |
| WO | WO 2013/114504 A1 | 8/2013 |
| WO | WO 2013/141599 A1 | 9/2013 |
| WO | WO 2013/141625 A1 | 9/2013 |
| WO | WO 2013/145519 A1 | 10/2013 |
| WO | WO 2013/151530 A2 | 10/2013 |
| WO | WO 2013/161278 A1 | 10/2013 |
| WO | WO 2013/185330 A1 | 12/2013 |
| WO | WO 2013/189708 A1 | 12/2013 |
| WO | WO 2014/002355 A1 | 1/2014 |
| WO | WO 2014/004965 A1 | 1/2014 |
| WO | WO 2014/007990 A1 | 1/2014 |
| WO | WO 2014/020128 A1 | 2/2014 |
| WO | WO 2014/022797 A1 | 2/2014 |
| WO | WO 2014/027740 A1 | 2/2014 |
| WO | WO 2014/029284 A1 | 2/2014 |
| WO | WO 2014/048309 A1 | 4/2014 |
| WO | WO 2014/051260 A1 | 4/2014 |
| WO | WO 2014/061911 A1 | 4/2014 |
| WO | WO 2014/067485 A1 | 5/2014 |
| WO | WO 2014/069928 A1 | 5/2014 |
| WO | WO 2014/070649 A1 | 5/2014 |
| WO | WO 2014/101430 A1 | 7/2014 |
| WO | WO 2014/183780 A1 | 11/2014 |
| WO | WO 2014/184392 A2 | 11/2014 |
| WO | WO 2015/042069 A1 | 3/2015 |

OTHER PUBLICATIONS

Jain et al., "Machine Type Communications in 3GPP Systems", Technology Updates on LTE Advanced, IEEE Communications Magazine, pp. 28-35 (Nov. 2012).

Ksentini et al., "Congestion-Aware MTC Device Triggering", IEEE ICC 2014—Ad-hoc and Sensor Networking Symposium, pp. 294-298 (Jun. 2014).

Suzuki et al., "Core Network (EPC) for LTE", NTT DOCOMO Technical Journal, 13(1): 26-32 (Jun. 2011).

http://web.archive.org/web/20151110142118/http://www.openmobilealliance.org/.pdf, "Promoting Innovation in the Wireless Ecosystem", Open Mobile Alliance Mobile Phone Standards & Specifications, downloaded on May 4, 2018.

3GPP TS 23.002 V13.6.0, "3rd Generation Partnership Project; Technical Specification Group Services and System Aspects; Network architecture (Release 13)" (Jun. 2016).

3GPP TS 23.040 V12.2.0, "3rd Generation Partnership Project; Technical Specification Group Core Network and Terminals; Technical realization of the Short Message Service (SMS) (Release 12)" (Dec. 2013).

3GPP TR 23.888 V0.3.1, "3$^{rd}$ Generation Partnership Project; Technical Specification Group Services and System Aspects; System Improvements for Machine-Type Communications; (Release 10)" (Mar. 2010).

3GPP TR 23.888 V11.0.0, "3rd Generation Partnership Project; Technical Specification Group Services and System Aspects; System improvements for Machine-Type Communications (MTC) (Release 11)" (Sep. 2012).

3GPP TS 23.401 V13.4.0, "3rd Generation Partnership Project; Technical Specification Group Services System Aspects; General Packet Radio Service (GPRS) enhancements for Evolved Universal Terrestrial Radio Access Network (E-UTRAN) access (Release 13)" (Sep. 2015).

(56) References Cited

OTHER PUBLICATIONS

3GPP TS 23.060 V13.4.0, "3rd Generation Partnership Project; Technical Specification Group Services and System Aspects; General Packet Radio Service (GPRS); Service description; Stage 2 (Release 13)" (Sep. 2015).
3GPP TS 23.203 V12.8.0, "3rd Generation Partnership Project; Technical Specification Group Services and System Aspects; Policy and charging control architecture (Release 12)" (Mar. 2015).
3GPP TS 23.203 V13.4.0, "3rd Generation Partnership Project; Technical Specification Group Services and System Aspects; Policy and charging control architecture (Release 13)" (Jun. 2015).
3GPP TS 23.203 V13.8.0, "3rd Generation Partnership Project; Technical Specification Group Services and System Aspects; Policy and charging control architecture (Release 13)" (Jun. 2016).
3GPP TR 23.887 V12.0.0, "3rd Generation Partnership Project; Technical Specification Group Services and System Aspects; Study on Machine-Type Communications (MTC) and other mobile data applications communications enhancements (Release 12)" (Dec. 2013).
3GPP TS 23.682 V13.0.0, "3rd Generation Partnership Project; Technical Specification Group Services and System Aspects; Architecture enhancements to facilitate communications with packet data networks and applications (Release 13)" (Dec. 2014).
3GPP TS 23.682 V13.6.0, "3rd Generation Partnership Project; Technical Specification Group Services and System Aspects; Architecture enhancements to facilitate communications with packet data networks and applications (Release 13)" (Jun. 2016).
3GPP TS 29.272 V13.3.0, "3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 13)" (Sep. 2015).
3GPP TS 29.329 V12.5.0, "3rd Generation Partnership Project; Technical Specification Group Core Network and Terminals; Sh Interface based on the Diameter protocol; Protocol details (Release 12)" (Dec. 2014).
3GPP TS 29.338 V11.0.0, "3rd Generation Partnership Project; Technical Specification Group Core Network and Terminals; Diameter based protocols to support Short Message Service (SMS) capable Mobile Management Entities (MMEs) (Release 11)" (Dec. 2012).
3GPP TS 29.338 V12.5.0, "3rd Generation Partnership Project; Technical Specification Group Core Network and Terminals; Diameter based protocols to support Short Message Service (SMS) capable Mobile Management Entities (MMEs) (Release 12)" (Dec. 2014).
3GPP TS 29.368 V13.1.0, "3rd Generation Partnership Project; Technical Specification Group Core Network and Terminals; Tsp interface protocol between the MTC Interworking Function (MTC-IWF) and Service Capability Server (SCS) (Release 13)" (Sep. 2015).
3GPP TR 23.974 V2.0.0, "3rd Generation Partnership Project; Technical Specification Group Services and System Aspects; Support of Push service (Release 5)" (Sep. 2001).
3GPP TS 32.240 V13.2.0, "3rd Generation Partnership Project; Technical Specification Group Services and System Aspects; Telecommunication management; Charging management; Charging architecture and principles (Release 13)" (Jun. 2016).
3GPP TS 32.274 V12.6.0, "3rd Generation Partnership Project; Technical Specification Group Services and System Aspects; Telecommunication management; Charging management; Short Message Service (SMS) charging (Release 12)" (Jun. 2015).
3GPP TR 37.868 V11.0.0, "3rd Generation Partnership Project; Technical Specification Group Radio Access Network; Study on RAN Improvements for Machine-type Communications; (Release 11)" (Sep. 2011).
ETSI TS 123.198 V8.0.0, "Universal Mobile Telecommunications System (UMTS); LTE; Open Service Access (OSA); Stage 2 (3GPP TS 23.198 version 8.0.0 Release 8)" (Jan. 2009).
ETSI TS 123.204 V12.4.0, "Universal Mobile Telecommunications System (UMTS); LTE; Support of Short Message Service (SMS) over generic 3GPP Internet Protocol (IP) access; Stage 2 (3GPP TS 23.204 version 12.4.0 Release 12)" (Oct. 2014).
ETSI TS 123.682 V12.3.0, "Digital cellular telecommunications system (Phase 2+); Universal Mobile Telecommunications System (UMTS); LTE; Architecture enhancements to facilitate communications with packet data networks and applications (3GPP TS 23.682 version 12.3.0 Release 12)" (Apr. 2015).
ETSI TS 129.212 V12.8.0, "Universal Mobile Telecommunications System (UMTS); LTE; Policy and Charging Control (PCC); Reference points (3GPP TS 29.212 version 12.8.0 Release 12)" (Apr. 2015).
ETSI TS 129.214 V7.4.0, "Universal Mobile Telecommunications System (UMTS); Policy and charging control over Rx reference point (3GPP TS 29.214 version 7.4.0 Release 7)" (Apr. 2008).
ETSI TS 129.337 V12.4.0, "Universal Mobile Telecommunications System (UMTS); LTE; Diameter-based T4 Interface for communications with packet data networks and applications (3GPP TS 29.337 version 12.4.0 Release 12)" (Jan. 2015).
ETSI TS 129.338 V12.5.0, "Universal Mobile Telecommunications System (UMTS); LTE; Diameter based protocols to support Short Message Service (SMS) capable Mobile Management Entities (MMEs) (3GPP TS 29.338 version 12.5.0 Release 12)" (Jan. 2015).

* cited by examiner

SYSTEMS AND METHODS FOR MACHINE-TYPE COMMUNICATION

RELATED APPLICATIONS

This application claims priority under 35 U.S.C. § 119 to Indian Application No. 3575/DEL/2015, filed Nov. 2, 2015, which is incorporated herein by reference in its entirety.

TECHNICAL FIELD

The disclosed embodiments generally relate to network components for mobile network, and more specifically, to the network functions for managing machine-type communication.

BACKGROUND

Modern mobile networks are optimized for content-rich multimedia applications for human subscribers. Such networks have been designed based on human communication characteristics that require low latency, always-on, delay intolerant and time sensitive network interaction.

However, maintaining such networks requires huge investments from Mobile Network Operators. Human subscribers may generate enough revenue to recoup these investments, but Machine Type Communication (MTC) devices tend to generate significantly lower revenues. Human subscribers and MTC devices also tend to use network resources differently. For example, the number of control plane messages in relation to the amount of data consumed is relatively small for human subscribers in comparison to MTC devices. MTC devices often transmit small amount of data frequently to an application server. But each data session may require several control messages to establish and teardown network connections. For MTC devices, the number of control messages is therefore high compared to the volume of data transferred. Furthermore, because Mobile Network Operators traditionally bill based on data usage, revenue opportunities may be limited. Additionally, the mobile network may require additional memory resources to support bearers for large numbers of infrequently active MTC devices. These requirements may increase costs and potentially decrease profits for Mobile Network Operators Excessive control signaling may degrade mobile network performance. Consequently, control signaling by low revenue MTC devices may negatively affect the user experience of high revenue human subscribers. Furthermore, increasing network capacity to handle large numbers of rarely used bearers may increase operational costs. Therefore a need exists for systems and methods for improved management of MTC device communication over mobile networks.

SUMMARY

The disclosed embodiments may be used to implement improved network functions providing control plane and user plane management for machine-type communication (MTC) device communication. These network functions improve upon network entities disclosed in the 3GPP LTE specifications such as the Machine Type Communication— Interworking Function and the PDN gateway with traffic detection function. In particular, as described below, these systems and methods may address at least the problems of excessive control plane usage, limited charging opportunities, and increased network capacity described above.

The disclosed embodiments may include, for example, a system for managing machine-type communication comprising a machine-type communication gateway (MTC-GW). The MTC-GW may include a centralized policy engine and device trigger storage. The MTC-GW may be communicatively connected to control nodes of a mobile network. The MTC-GW may be communicatively connected to trigger providers of a fixed network. In some aspects, the MTC-GW may include at least one processor and at least one non-transitory memory storing instructions that, when executed by the at least one processor, cause the machine-type communication gateway to perform certain operations. The operation may include receiving device triggers from the trigger providers; storing the device triggers in the device trigger storage in queues; and providing the device triggers to the control nodes at rates determined by the centralized policy engine.

In some aspects, the system may further store first device triggers for a first region in a first queue. As used herein, regions may comprise logical divisions of a mobile network and/or geographic areas. As a non-limiting example, a region may comprise one or more of a cell associated with a single Evolved Node B (eNodeB), a tracking area associated with multiple eNodeBs, a Mobility Management Entity (MME) pool area associated with one or more MMEs, a serving gateway (SGW) service area, and a Home Public Land Mobile Network (HPLMN), or similar logical division of mobile network 155. As would be recognized by one of skill in the art, regions may comprise other logical divisions of a mobile network. As a further non-limiting example, a region may comprise one or more of a city, state, country, territory, and component thereof. The system may provide the first device triggers to control nodes for the first region at a first rate. In certain aspects, the centralized policy engine may adjust the first rate based on status-of-network information concerning the first region, and/or a day and time. The status-of-network information may include, for example, congestion information. For example, the congestion information may indicate increased congestion. The adjusted first rate may then comprise a reduced rate. As an additional example, the congestion information indicates decreased congestion. The adjusted first rate may then comprise an increased rate. In some aspects, the status-of-network information may be received from the control nodes of the mobile network.

In certain aspects, the system may further store second device triggers for the first region in a second queue. The system may provide the second device triggers at a second rate. A first priority of the first device triggers may be greater than a second priority of the second device triggers. The first rate may then be greater than the second rate.

In various aspects, the machine-type communication gateway may communicate with a Home Subscriber Server containing first location information, and may determine the first region based on the first location information. The first location information may comprise one or more of a cell-id or network node identifier. In some aspects, the control nodes may comprise one or more of Mobile Switching Center (MSC) nodes, C-SGN nodes, MME nodes, and Serving GPRS Support Nodes (SGSNs), and the first region may comprise a geographic area served by a Node B, eNodeB, or base transceiver station (BTS). In some aspects, the operations of the system may further comprise providing one or more of queue status information and device trigger status information to the mobile network.

The device triggers may be provided for delivery in SMS messages. The machine-type communication gateway may provide the device triggers to the control nodes using one or more of the E, Gd, Gdd, SGd, T5a, T5b, T5c, T6a and T6b interfaces. The operations of the system may further comprise receiving an access restriction indication from the mobile network. The system may receive a first device trigger for a first MTC device tolerant of access restrictions, the first device trigger having a first priority. The system may store the first device trigger based on the access restriction indication and the first priority. The system may provide the first device trigger following termination of the access restriction. The access restriction indication may comprise an indication of Extended Access Barring.

In some aspects, the machine-type communication gateway is communicatively connected to a rules node. The operations of receiving device triggers may further comprise receiving from a first trigger provider a first device trigger including rules parameters. In some aspects, the device trigger may explicitly encode the rules parameters. In certain aspects, the device trigger may implicitly determine the rules parameters. This implicit determination may depend on the configuration in the machine-type communication gateway. For example, the machine-type communication gateway may be configured to process certain device triggers as if they explicitly encoded rules parameters. In some aspects, the system may be configured to perform the additional operations of extracting the rules parameters from the device triggers, and providing the rules parameters to the rules node to generate parameterized flow control rules for provision on a gateway node. The rules node, for example, may comprise a Policy and Charging Rules Function.

In various aspects, the system may be configured to perform additional operations. The additional operations may comprise receiving from one or more of the control nodes by the machine-type communication gateway a data session request for a first MTC device. The additional operations may also comprise authorizing the first MTC device to access the mobile network. The system may be further configured to communicate with a subscriber information node. The additional operations may further comprise receiving first MTC device information from the subscriber information node and receiving status-of-network information from the mobile network. Authorization to access the mobile network may be based on the first MTC device information and the status-of-network information for the mobile network. Authorization to access the mobile network may be based on previously received device triggers. The subscriber information node may comprise a Home Subscriber Server.

The disclosed embodiments may also include, for example, a system for mobile network memory conservation. The mobile network memory conservation system may comprise a mobile network that connects a first MTC device to a Packet Data Network; a machine-type communication gateway interworking between a first trigger provider and the mobile network; and a non-transitory storage that stores bearer information. The mobile network may receive from the machine-type communication gateway an indication to establish a data session between the first trigger provider (or in some aspects a node specified within the device trigger) and the first MTC device. The mobile network may retrieve the stored bearer information from the storage, commits memory resources by establishing one or more bearers for the data session using the stored bearer information, and releases memory resources by putting the bearer information into storage after completion of the data session. In some aspects, the indication to establish a data session may comprise a device trigger. In certain aspects, the mobile network may update the stored bearer information upon completion of the data session. The mobile network may comprise a gateway node. Committing memory resources may comprise copying at least a portion of the stored bearer information into a memory of the gateway node. In certain aspects, the bearer information comprises one or more of at least one IP address for the MTC device, subscriber information, and gateway device information. In some aspects, the mobile network releases the memory resources upon expiration of a timer.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings are not necessarily to scale or exhaustive. Instead, emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure. In the drawings.

DETAILED DESCRIPTION

The following detailed description incorporates by reference in their entirety 3GPP TS 123.002 V13.6.0, released June 2016; 3GPP TR 23.888 V11.0.0, released September 2012; 3GPP TR 37.868 V11.0.0, released September 2011; 3GPP TS 23.682 V13.6.0, released June 2016; 3GPP TS 32.240 V13.2.0, released June 2016; 3GPP TS 29.368 V13.1.0, released September 2015; and 3GPP TS 23.203 V13.8.0, released June 2016. These incorporated specifications are collective referred to herein as the "3GPP Specifications."

Reference will now be made in detail to exemplary embodiments as with reference to the accompanying drawings. In some instances, the same reference numbers will be used throughout the drawings and the following description to refer to the same or like parts. These embodiments are described in sufficient detail to enable those skilled in the art to practice the disclosed embodiments and it is to be understood that other embodiments may be utilized and that changes may be made without departing from the scope of the disclosed embodiments. For example, components of the disclosed exemplary systems and apparatuses may be combined or separated into subcomponents without departing from the scope of the disclosed embodiments. The following detailed description, therefore, is not to be interpreted in a limiting sense.

Figure 1:
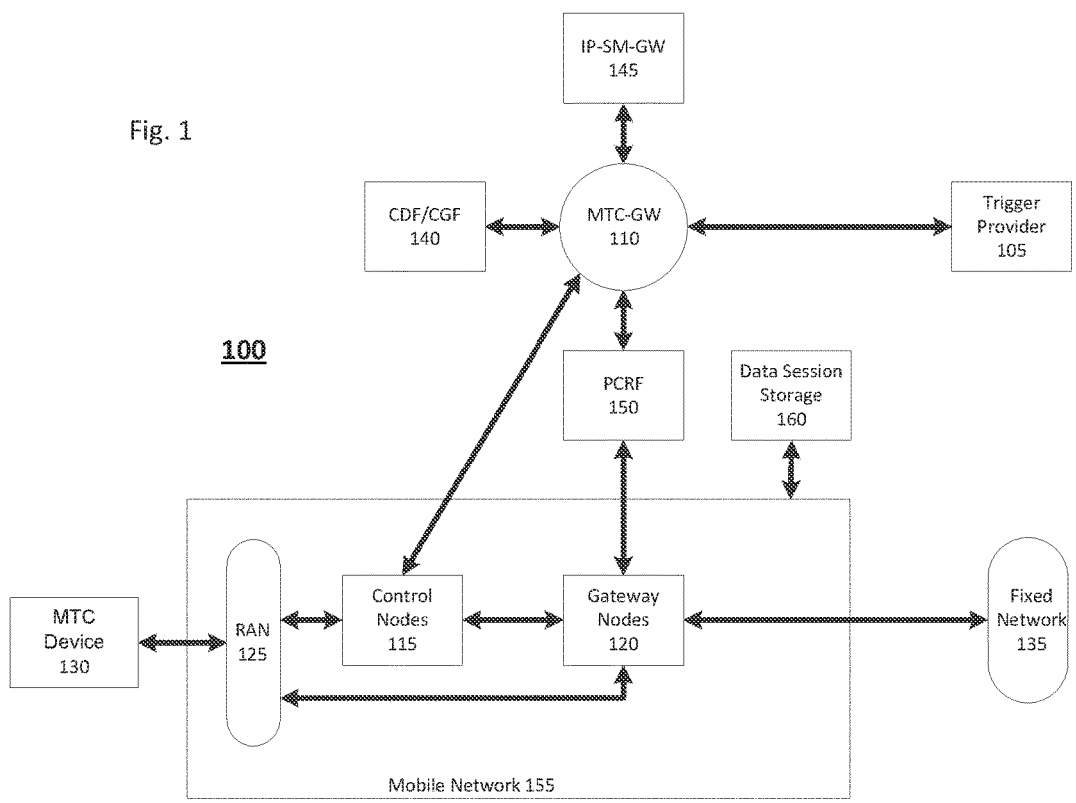
FIG. 1 depicts an exemplary system for managing machine-type communication.

FIG. 1 depicts an exemplary system 100 for managing machine-type communication consistent with disclosed embodiments. Machine-type communications may involve sensors, devices, machines, applications, or servers, such as components of the internet of things. For example, machine-type communications may involve applications such as environmental monitoring, infrastructure management, energy management, medical or healthcare systems, and transportation. Specific, non-limiting examples of machine-type communications may include smart electrical meters reporting electrical usages; instructions to manage electrical distribution equipment; scheduling and status information from transportation vehicles, such as buses; and/or alarms or status information from security systems. Machine-type communications may involve data or instructions. For example, MTC device 130 may be configured to provide data to a trigger provider, or take actions in response to instructions provided by a trigger provider.

Characteristics of machine-type communications may differ from characteristics of human-user communications. For examples, human-user communications may require a higher quality of service than machine-type communications. Human-user communications may be less tolerant of delay than machine type communications. Machine-type communication may be of shorter duration, as compared to human-user communication. The characteristics of Machine-type communications may be predictable. For example, machine type communications may be initiated periodically, or in response to a device trigger provided by a trigger provider. To accommodate machine-type communications without compromising the experience of human users, system 100 may therefore be configured to implement policies governing machine-type communication, as described in detail below.

System 100 may enable MTC device 130 to communicate with fixed network 135 over a mobile network 155, consistent with disclosed embodiments. System 100 may comprise a control plane that conveys data for configuring the connection between fixed network 135 and MTC device 130. System 100 may comprise a user plane, which supports the connection between fixed network 135 and MTC device 130. Components of system 100 may support interworking with other networks, control over the communication between MTC device 130 and fixed network 135, and recording charging information for use of system 100.

As used herein, trigger provider 105 describes a source of device triggers for components of system 100, consistent with disclosed embodiments. The description of trigger provider 105 is not intended to suggest a single operator, device, component, or system. For example, trigger provider 105 may encompass one or more of a SCS and an application server configured to provide device triggers, or it may encompass an SCEF (Service Capability Exposure Function) which is a specific type of SCS. The SCS and application server may or may not be configured to communicate. The SCS and application server may or may not have distinct operators. In certain aspects, one or more operators of trigger provider 105 may differ from the operator of the remaining components of system 100. As used herein, multiple trigger providers may describe multiple distinct sources of device triggers. For example, an SCS providing device triggers to other components of system 100 based on requests from a first application server may comprise a first trigger provider. The first application server providing device triggers directly may comprise a second trigger provider.

Trigger provider 105 may comprise one or more physical or virtual servers hosting one or more application servers. The application servers may be configured to host one or more applications. The hosted one or more applications may be configured to communicate with MTC device 130. In some aspects, an application may be configured to request establishment of a data session with MTC device 130. In some embodiments, an application may provide a device trigger to request establishment. For example, an application may be configured to provide the device trigger to the Machine-Type Communication Gateway 110 (MTC-GW 110). In some embodiments, trigger provider 105 may comprise a service capability server (SCS), including a particular type of SCS functionality known as the Service Capability Exposure Function (SCEF). The SCS may provide capabilities to one or more applications. For example, the SCS may expose one or more functionalities such as call control, user management, and/or billing for use by applications. In certain aspects, trigger provider 105 providing a device trigger to MTC-GW 110 may comprise an application server providing one or more requests to an SCS. The SCS may be configured to provide a device trigger to MTC-GW 110 after receiving a request from the application server. The SCS may be configured to provide the device trigger via a Tsp reference point, as defined in the 3GPP Specifications. In a further example, trigger provider 105 may be configured to provide a device trigger through fixed network 135. In certain aspects, trigger provider 105 may be configured to connect to the user plane of system 100 through the Gi/SGi reference points, as defined in the 3GPP Specifications.

MTC-GW 110 may be configured to manage machine-type communications between the MTC device 130 and trigger provider 105, consistent with disclosed embodiments. In some embodiments, as described below with regards to FIG. 8, MTC-GW 110 may comprise a virtual network function. In certain embodiments, MTC-GW 110 may be implemented on one or more servers. For example, MTC-GW may be implemented on a cloud computing system, as would be recognized by one of ordinary skill in the art.

MTC-GW 110 may be configured to provide the functionality of a Machine-Type Communication Interworking Function (or MTC-IWF), at least the capabilities and functions described in the 3GPP Specifications, consistent with disclosed embodiments. This functionality may be implemented through modified MTC-IWF 203, described in greater detail below. In some embodiments, MTC-GW 110 may be connected to a subscriber information node, such as an external HSS/HLR, Subscription Profile Repository, or User Data Repository, as described in the 3GPP Specifications. MTC-GW 110 may be configured to provide the functionality of a Service Capability Server, with at least the capabilities and functions described in the 3GPP Specifications, consistent with disclosed embodiments. This functionality may be implemented through SCS 207, described in greater detail below.

MTC-GW 110 may be configured to perform the functions of a Short Message Service Center (SMS-SC) and/or Gateway Mobile Switching Center (GMSC), consistent with disclosed embodiments. In certain embodiments, MTC-GW 110 may be configured to interwork with IP-SW-GW 145 to handle SMS messages via IMS messaging. In some embodiments, MTC-GW 110 may be configured to provide protocol interworking between packet-switched SMS networks and circuit switched SMS networks or IMS networks. In certain embodiments, as discussed in greater detail below, MTC-GW 110 may implement store-and-forwarding of SMS messages, eliminating the need for a separate SMS-SC. MTC-GW 110 may be configured to provide SMS messages, or the content of SMS messages, to control nodes 115 of mobile network 155 through the E, Gd, Gdd, SGd, T5a, T5b, T5c, T6a or T6b interfaces described in the 3GPP Specifications, or similar interfaces.

MTC-GW 110 may be configured to receive status of network information from one or more components of mobile network 155, consistent with disclosed embodiments. In some embodiments, this information may concern congestion information, such as capacity, utilization, and performance information. In certain aspects, the congestion information may concern capacity, utilization, and performance information for a cellular node. In some aspects, the congestion information may include congestion information concerning RAN 125. As an additional example, the congestion information may concern capacity, utilization, and performance information for one or more components of RAN 125, such as one or more base stations (BTSs), Node Bs, or eNodeBs.

MTC-GW 110 may be configured to communicate with a Charging Data Function/Charging Gateway Function (CDF/CGF 140) as described in the 3GPP Specifications, consistent with disclosed embodiments. In some embodiments, MTC-GW 110 may be configured to perform real-time monitoring of machine-type communications. In some aspects, MTC-GW 110 may be configured to generate charging events associated with receipt, forwarding, or processing of device triggers. In certain aspects, MTC-GW 110 may be configured to generate charging events associated with functionality provided by the MTC-GW 110 acting as a SCS towards trigger provider 105. In some aspects, as described above, MTC-GW 110 may be configured to expose APIs providing capabilities for trigger provider 105. For example, MTC-GW 110 may be configured with a Charging Trigger Function, as described in the 3GPP Specifications, to generate charging events from the use of such APIs. In certain aspects, MTC-GW 110 may be configured to generate Charging Data Records. MTC-GW 110 may be configured to forward charging records or information for generating Charging Data Records to CDF/CGF 140. MTC-GW 110 may be configured to interact with CDF/CGF 140 over a diameter-based interface, such as the Rf interface, or a GTPP-based interface, such as the Ga interface. In some aspects, MTC-GW 110 may be configured to directly transfer CDRs to an offline billing system.

Mobile Network 155 may be configured to maintain a connection between the MTC device 130 and the fixed network 135, consistent with disclosed embodiments. Mobile network 155 may comprise Control Nodes 115, Gateway Nodes 120, and Radio Access Network (RAN) 125. Control nodes 115 may serve as interfaces between Gateway Nodes 120 and RAN 125. Control nodes 115 may comprise nodes responsible for one or more of paging MTC device 130, authenticating a user or user device, mobility management, location registration, bearer creation and destruction, and selections of one or more of Gateway nodes 120 towards fixed network 135. Each of control nodes 115 may correspond to a geographic area. In some embodiments, control nodes 115 may comprise one or more of a MSC, C-SGN, MME, and SGSN, with at least such capabilities and functions as described in Network Architecture and known to one of skill in the art.

Gateway nodes 120 may be configured to convey data from MTC device 130 to fixed network 135. In some embodiments, gateway nodes 120 may be configured to receive data from RAN 125. In certain embodiments, gateway nodes 120 may be configured to receive data from control nodes 115. In some embodiments, one or more of gateway nodes 120 may be configured to as a mobility anchor to support handovers as MTC device 130 moves between networks or between regions of mobile network 155. As a non-limiting example, a region may comprise one or more of a cell associated with a single eNodeB, a tracking area associated with multiple eNodeBs, an MME pool area associated with one or more MMES, a SGW service area, and a HPLMN, or similar logical division of mobile network 155. As would be recognized by one of skill in the art, regions may comprise other logical divisions of a mobile network. As a further non-limiting example, a region may comprise one or more of a city, state, country, territory, and component thereof. In certain aspects, one or more of gateway nodes 120 may be configured to allocate IP addresses to MTC device for access through fixed network 135. In some aspects, one or more of gateway nodes 120 may be configured to implement charging, gating, and data rate enforcement functions. In some embodiments, gateway nodes 120 may comprise one or more of a Gateway GPRS support node and a PDN gateway, with at least such capabilities and functions as described in the 3GPP Specifications.

RAN 125 may be configured to manage interaction between MTC device 130 and the remainder of system 100. RAN 125 may comprise transceivers for communicating with MTC device 130. RAN 125 may comprise controllers for managing the transceivers. In some embodiments, RAN 125 may comprise one or more of a Base Transceiver Station, a Node B, and/or an eNodeB, with at least such capabilities and functions as described in the 3GPP Specifications.

MTC device 130 may comprise a termination point for machine-type communication. For example, MTC device 130 may comprise a smart electrical meter that reports electrical power usage periodically. As an additional example, MTC device may comprise a vehicle, such as a bus or taxi, configured to report location and service status periodically. As a further example, MTC device 130 may comprise a mobile device, such as a smartphone, tablet, laptop computer, or similar device configured with an application that reports contextual information, such as location and device state.

MTC device 130 may occupy one of the three states of attached, idle, and detached, consistent with disclosed embodiments. MTC device 130 may be configured to attach to mobile network 155. Once MTC device 130 is attached to mobile network 155, MTC device 130 may be configured to contact a trigger provider 105 through fixed network 135. MTC device 130 may be configured to register with the trigger provider 105. MTC device 130 may be configured to enter an idle mode until a trigger condition is met. In some aspects, the trigger condition may originate with MTC device 130. In certain aspects, the trigger condition may be specified in a device trigger provided by trigger provider 105. For example, an application running on MTC device 130 may prompt MTC device 130 to move from idle mode to attached mode and initiate a data session with a trigger provider 105 or other application node. As an additional example, trigger provider 105 may contact MTC device 130 directly through the user plane by sending a request to one or more of gateway nodes 120; and/or indirectly through the control plane by sending a device trigger to an SCS or MTC-GW 110. Such a connection attempt may cause the mobile network 155 initiate a paging procedure towards the MTC device to establish a connection. Should the paging procedure be successful, MTC device 130 may enter the connected state and commence a data session with trigger provider 105 or other application node indicated by the device trigger. Should the paging procedure be unsuccessful, the MTC device may be considered to have entered a detached state, and one or more of control nodes 115 or MTC-GW 110 may store an indication of this status. Once contact with MTC device 130 is regained, one or more of control nodes 115 or MTC-GW 110 may update the stored indication to show that MTC device 130 is now attached. Either mobile network 155 or MTC device 130 may expressly detach MTC device 130 from mobile network 155.

Fixed network 135 may comprise a packet data network to which MTC device 130 and trigger provider 105 may be connected, consistent with disclosed embodiments. Fixed network 135 may comprise a network such as the internet, or an SIP-based IMS network in certain aspects. As used herein, fixed network 135 may describe the logical connection exposed towards the gateway nodes, together with supporting physical infrastructure, as would be recognized by one of skill in the art. Fixed network 135 may be configured to communicate with gateway notes 120 using the Gi/SGi reference point described in the 3GPP Specifications.

IP-SM-GW 145 may comprise a source of generic IMS messages, consistent with disclosed embodiments. IP-SM-GW 145 may be realized as one or more servers configured with non-transitory instructions. In some aspects, IP-SM-GW 145 may comprise a virtual network function hosted on a cloud computing platform. MTC-GW 110 may be configured to interwork with IP-SM-GW 145 to deliver SMS content via IMS messages over the packet-switched domain of the 3GPP network.

CDF/CGF 140 may comprise a node for generating charging data for provision to an external billing system, consistent with disclosed embodiments. CDF/CGF 140 may be realized as one or more servers configured with non-transitory instructions. In some aspects, CDF/CGF 140 may comprise a virtual network function hosted on a cloud computing platform. CDF/CGF 140 may be configured to receive charging events using the Rf interface point, as described in the 3GPP Specifications. Charging events may be triggered by network resource usage. CDF/CGF 140 may be configured to construct charging data records (CDRs), based on the information contained in the charging events. CDF/CGF 140 may be configured to manage, route, or pre-process CDRs, as described in the 3GPP Specifications.

PCRF 150 may comprise a policy enforcement point of system 100, consistent with disclosed embodiments. In some aspects, PCRF 150 may comprise a server configured with instructions stored in a non-transitory memory. In certain aspects, PCRF 150 may comprise a virtual network function hosted on a cloud computing system. Consistent with disclosed embodiments, PCRF 150 may be configured to receive bearer information and traffic detection information from control nodes 115. In certain aspects, PCRF 150 may be configured to receive subscriber policies and profiles from a Subscriber Profile Repository, with at least such capabilities and functions as described in the 3GPP Specifications. In some aspects, PCRF 150 may be configured to receive application information from an application function. Based on this received information, PCRF 150 may be configured to automatically create rules and policies for each subscriber active in the network. In some embodiments, PCRF 150 may be configured to generate data session level usage reporting, quality of service regulation, event triggering, monitoring, and gating rules, as described in the 3GPP Specifications. PCRF 150 may be configured to provide the rules to one or more of gateway nodes 120. The one or more gateway nodes may be configured to implement the provided rules to restrict traffic flow, consistent with disclosed embodiments.

Data session storage 160 may comprise one or more databases separate from mobile network 155. Data session storage 160 may comprise memory dedicated to storing configuration information for connections between MTC device 130 and fixed network 135. In some aspects, data session storage 160 may be configured to store bearer information for IP-CAN sessions, such as the IP-CAN sessions described in the 3GPP Specifications. For example, data session storage 160 may be configured to store one or more of external bearer information, S5/S8 bearer information concerning connections between gateway nodes, S1 bearer information concerning connections between gateway nodes 120 and RAN 125, and radio bearer configuration information. As a further example, data session storage 160 may be configured to store PDP context information. In some embodiments, system 100 may implement an "always on" policy in which bearers between the SGW and PGW persist until MTC device is turned off, even when the MTC device becomes idle. As described below in greater detail with regard to FIG. 6, system 100 may be configured to store this bearer information in data session storage 160, and purge this information from physical or virtual memory resources associated with components of mobile network 155. Upon receiving a device trigger from trigger provider 105, system 100 may be configured to fetch the stored bearer information and restore the bearers connecting MTC device 130 and trigger provider 105.

In some embodiments, storing bearer information on data session storage 160 may reduce physical or virtual memory requirements associated with one or more other components of system 100, such as gateway nodes 120, control nodes 115, and RAN 125. In certain embodiments, data session storage 160 may replace more expensive memory required by other components of system 100. In some embodiments, data session storage 160 may be communicative connected to mobile network 155. In certain embodiments, data session storage 160 may be communicative connected (not shown in FIG. 1) to one or more of MTC-GW 110, PCRF 150, CDF/CGF 140, Subscription Profile Repository, and User Data Repository.

Figure 2:
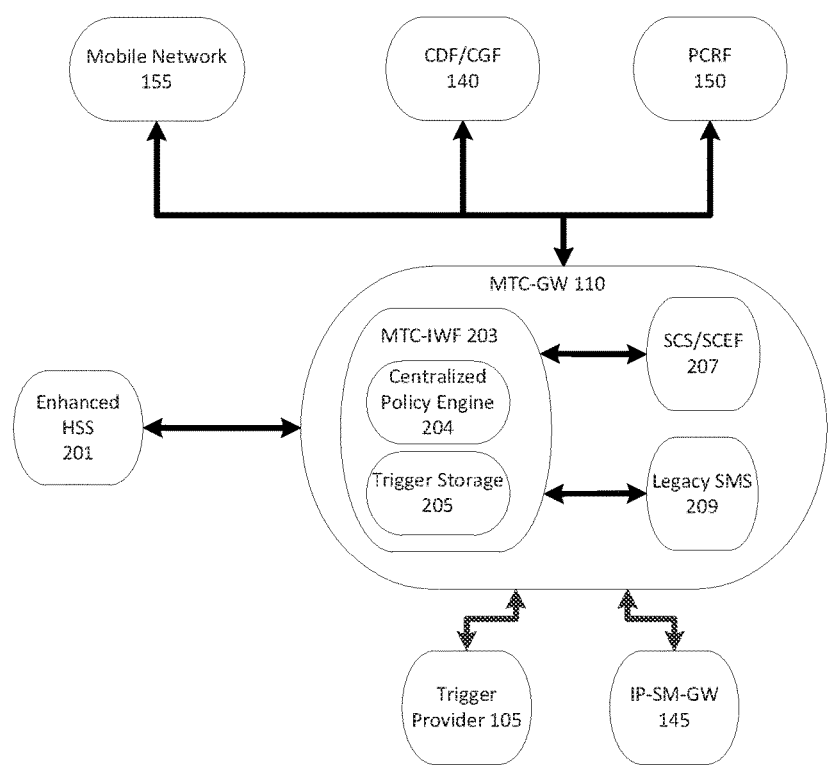
FIG. 2 depicts an exemplary machine-type communication gateway.

FIG. 2 depicts an exemplary machine-type communication gateway 110 (MTC-GW 110), consistent with disclosed embodiments. In some aspects as described above, MTC-GW 110 may be configured to communicate with one or more of mobile network 155, CDF/CGF 140, PCRF 150, trigger provider 105, and IP-SM-GW 145. In certain embodiments, MTC-GW may be configured to include at least the functionality of a modified MTC-IWF 203 containing a centralized policy engine 204 and a trigger storage 205; and SCS 207; and legacy SMS 209. Modified MTC-IWF 203 may also be configured to communicate with enhanced HSS 201.

Modified MTC-IWF 203 may be configured to manage control plane requests concerning machine-type communications from trigger provider 105 and/or components of trigger provider 105, consistent with disclosed embodiments. Modified MTC-IWF 203 may be configured to receive device triggers and route device triggers to appropriate control nodes 115 of mobile network 155. Modified MTC-IWF 203 may be configured to report the acceptance or non-acceptance of the device trigger request, and the success or failure of the device trigger delivery. Using centralized policy engine 204 and trigger storage 205, modified MTC-IWF 203 may be configured to apply policies governing the storage, delivery, and forwarding of device triggers, as described below. MTC-GW 110 may be configured to expose an interface to an SCS. The interface may be the Tsp interface described in the 3GPP Specifications.

Centralized policy engine 204 may be configured to create, manage, and store policies concerning machine-type communication. In some embodiments, centralized policy engine 204 may comprise one or more servers configured with instructions stored in a non-transitory memory. In some embodiments, centralized policy engine 204 may comprise a virtual network function hosted on a cloud computing platform. Centralized policy engine 204 may be configured to determine restrictions on machine type communication using system 100. For example, centralized policy engine 204 may be configured to determine trigger delivery rates; delivery window or times of day; control plane access requirements; user plane uplink and downlink access controls; and timer information (e.g. back-off timers, validity timers). For example, centralized policy engine 204 may be configured to associate one or more such access restrictions with regions of mobile network 155. As an additional example, centralized policy engine 204 may be configured to associate one or more such access restrictions with machine-type communications having certain characteristics, such as destination device or category of devices, originating application, or category of applications; priority level; or similar characteristics of the machine-type communication. For example, certain MTC devices 130 may be designated as tolerant of access restrictions, based on the above criteria. As a further example, centralized policy engine 204 may be configured to implement such policies based on status-of-network information received from mobile network 155. For example, centralized policy engine 204 may be configured to impose restrictions based on congestion information. Such congestion information may concern regions of mobile network 155. In certain aspects, such congestion information may include one or more of capacity, utilization, and performance information.

Trigger storage 205 may be used to implement store and forwarding capabilities for MTC-GW 110, consistent with disclosed embodiments. In some embodiments, trigger storage 205 may comprise one or more servers configured with instructions stored in a non-transitory memory. In some embodiments, trigger storage 205 may comprise a virtual network function hosted on a cloud computing platform. As described in greater detail below, in some aspects, trigger storage 205 may include queues corresponding to regions of mobile network 155, categories of machine-type communications, priority levels (e.g., emergency communications or routine communications), or for combinations of region, category, and level.

SCS 207 may be configured to provide the functionality of a Service Capability Server, consistent with disclosed embodiments. For example, SCS 207 may be configured to provide standardized application programming interfaces towards trigger provider 105 and/or components of trigger provider 105. In certain aspects, these application program interfaces may be configured as web services. Such web services may be designed according to REST principles as would be understood by one of skill in the art. SCS 207 may also handle one or more security functions, such as authentication, authorization, and/or encryption, for communications between system 100 and trigger provider 105 and/or components of trigger provider 105.

Legacy SMS 209 may be configured to provide the functionality of a Short Message Service—Service Centre (SMS-SC) or Gateway Mobile Switching Center (GMSC), as described in the 3GPP Specifications. In some embodiments, combining modified MTC-IWF 203 and legacy SMS 209 in MTC-GW 110 may eliminate the need for the T4 interface described in the 3GPP Specifications. In some aspects, legacy SMS 209 may not be configured to expose T4 interface. In some aspects, modified MTC-IWF 203 may not be configured to expose T4 interface. In certain aspects, legacy SMS 209 may be configured to store SMS messages for delivery. In some aspects, legacy SMS 209 may be configured to route SMS messages for delivery. MTC-GW 110 may be configured to expose an interface to entities providing short message services. The interface may be the Tsms interface described in the 3GPP Specifications.

Enhanced HSS 201 may be configured to store subscription-related information for use by other components of system 100 for handling calls and/or data sessions, consistent with disclosed embodiments. For example, enhanced HSS 201 may handle MTC device identification, numbering and addressing information; network access control information for authentication and authorization; user location control information; and profile information. In some embodiments, enhanced HSS 201 may be configured to translate an external identifier of the MTC device 130 into an internal identifier specific to system 100. For example, enhanced HSS 201 may be configured to accept a URI, such as an SIP address. As another example, enhanced HSS 201 may be configured to provide or use an international mobile subscriber identity (or IMSI). Enhanced HSS 201 may also be configured to store current MTC device 130 serving node information. Enhanced HSS 201 may be configured to implement callback functions for designated MTC device 130. For example, enhanced HSS 201 may be configured to provide a callback when MTC device 130 attaches to mobile network 155. This callback may be based on information received from one or more components of mobile network 155. This callback may be provided to MTC-GW 110, consistent with disclosed embodiments.

Figure 3:
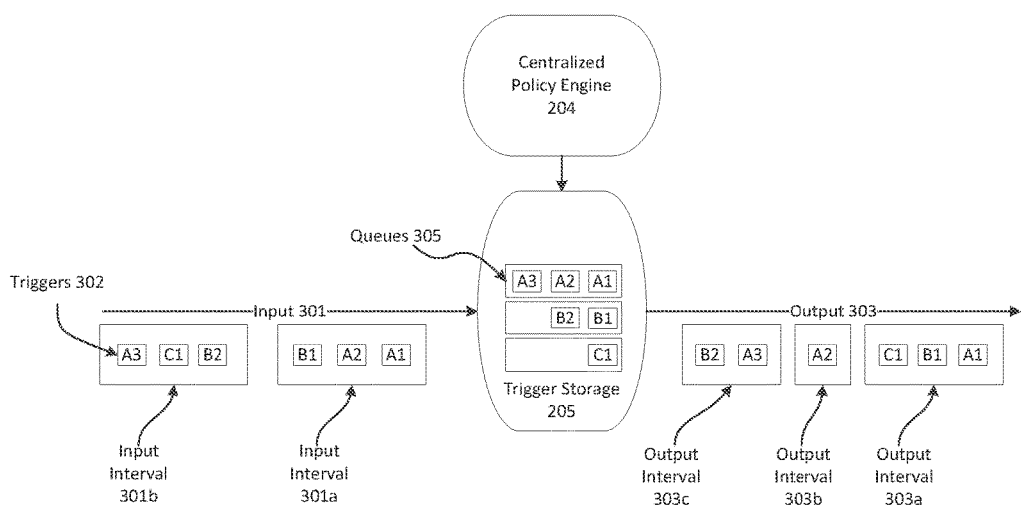
FIG. 3 depicts an exemplary schematic illustrating device trigger delivery control.

FIG. 3 depicts an exemplary schematic illustrating device trigger delivery control consistent with disclosed embodiments. In some embodiments, trigger storage 205 may be configured to receive device triggers, such as triggers 302. In certain aspects, trigger storage 205 may be configured to receive triggers 302 from trigger provider 105 and/or components of trigger provider 105. In some embodiments, trigger storage 205 may be configured with an input 301 and an output 303. In some embodiments, input 301 and output 303 may comprise a logical input and output, such as a port or memory location. In certain embodiments, trigger storage may process received inputs in intervals, such as input interval 301a and subsequent input interval 301b. In some embodiments, trigger storage may provide outputs in intervals, such as output interval 303a, and subsequent output intervals 303b and 303c. Triggers may be stored by trigger storage 205 in queues, such as queues 305. While FIG. 3 depicts only three queues for clarity, one of skill in the art would appreciate that the disclosed embodiments may require substantially greater numbers of queues. For example, trigger storage 205 may implement queues associated with regions of network 155, categories of machine-type communications, priority levels, or for combinations of region, category, and level.

Modified MTC-IWF 203 may be configured to associate device triggers with queues. In certain aspects, modified MTC-IWF 203 may be configured to determine the association of device triggers with queues based on information retrieved from one or more components of MTC-GW 110 and/or one or more components of system 100. For example, modified MTC-IWF may be configured to determine this association based on information received from enhanced HSS 201 and/or from an external HSS/HLR, Subscription Profile Repository, or User Data Repository. In some embodiments, the device trigger may contain information enabling retrieval of the location of the target MTC device, or identification of a component of mobile network 155 serving the target MTC device. For example the device trigger may contain information enabling retrieval of a cell-id or network node identifier. In certain aspects, modified MTC-IWF 203 may be configured to determine the association of device triggers with queues based on priority levels of the device triggers. For example, device triggers may indicate a priority of device trigger, such as routine or emergency. As described above, queues may be associated with priority levels. Modified MTC-IWF 203 may therefore be configured to associate device triggers with queues based on the priority of the device trigger and the priority of the queue.

Trigger storage 205 may be configured to receive trigger delivery rate information from centralized policy engine 204. In some embodiments, trigger storage 205 may dequeue triggers from one or more of queues 305 according to trigger delivery rate information received from centralized policy engine 204. FIG. 3 depicts an example of three triggers associated with one queue (triggers A1-A3) that arrive in input intervals 301a and 301b. These triggers are queued into a single queue and then dequeued according to information provided by centralized policy engine in three output intervals 303a, 303b, and 303c. As shown in FIG. 3, one or more triggers may be dequeued from multiple queues during each output interval. Trigger storage 205 may be configured to dequeue triggers according to restrictions imposed by centralized policy engine 204. Such restrictions may comprise rate restrictions, governing the rate at which triggers may be dequeued; time restrictions, governing when triggers may be dequeued; and availability restrictions, for example only dequeuing triggers when the destination MTC device is attached. For example, trigger storage 205 may be configured to dequeue triggers in response to an indication that the destination MTC device has attached. In certain aspects, this indication may be received by MTC-GW 110. In various aspects, MTC-GW 110 may be configured to provide a registration request for the destination MTC device. In some aspects, the indication may be provided in response to the registration request. In certain aspects, this indication may be provided by enhanced HSS 201. As a non-limiting example of varying trigger delivery rates, triggers B1 and B2 shown in FIG. 3. are dequeued at half the rate of triggers A1-A3. In some embodiments, centralized policy engine 204 may determine rate restrictions based on the relative priority of the queues. For example, a queue associated with emergency triggers may have a higher rate restriction than a queue associated with routine device triggers.

In some embodiments, device triggers may be associated with validity conditions, and trigger storage 205 may be configured to only output triggers satisfying associated validity conditions. For example, trigger storage 205 may be configured to dequeue and discard device triggers not satisfying validity conditions. Such validity conditions may include lifetime timers. In certain aspects, trigger storage 205 may be configured to continue dequeuing triggers until a valid trigger is dequeued. In some embodiments, as discussed below, trigger storage 205 may expose information regarding queues 305. For example, MTC-GW 110 may access information regarding queues 305 and expose that information to other elements of system 100, including trigger provider 105 and/or components of trigger provider 105 and mobile network 155. In response, for example, components of system 100 may indicate changes to trigger delivery policies. For example, one or more components of mobile network 155 may be configured to indicate that delivery of stored triggers is warranted, after receiving an indication of queue status. As a further example, one or more components of mobile network 155 may be configured to indicate that delivery of stored triggers is warranted when the length of a queue exceeds a certain threshold. Such a delivery threshold may be predetermined.

Consistent with disclosed embodiments, centralized policy engine 204 may be configured to adjust a trigger delivery rate based on status-of-network information received from mobile network 155. For example, centralized policy engine 204 may be configured to receive an indication of increased congestion in one or more components of mobile network 155. In response, centralized policy engine 204 may be configured to reduce a trigger delivery rate for a queue associated with the one or more congested components of mobile network 155. In some embodiments, centralized policy engine 204 may be configured to identify an increase in congestion based on one or more of capacity, utilization, and performance information. Similarly, centralized policy engine 204 may be configured to receive an indication of decreased congestion in one or more components of mobile network 155. In response, centralized policy engine 204 may be configured to increase a trigger delivery rate for a queue associated with the one or more congested components of mobile network 155. As described above, certain queues may be associated with higher priority device triggers than other queues. In some aspects, centralized policy engine 204 may be configured to adjust the trigger delivery rate of a lower priority queue, but not the trigger delivery rate of a higher priority queue. For example, centralized policy engine 204 may be configured to reduce the trigger delivery rate for a lower priority queue, but not a higher priority queue, associated with a region of mobile network 155, category machine-type communications, priority level, or combination of region, category, and level. In some embodiments, centralized policy engine 204 may be configured to adjust one or more trigger delivery rates for MTC devices 130 tolerant of access restrictions. In some aspects, adjusting the trigger delivery rate may include immediately providing all stored triggers, or halting trigger delivery for a queue.

Figure 4:
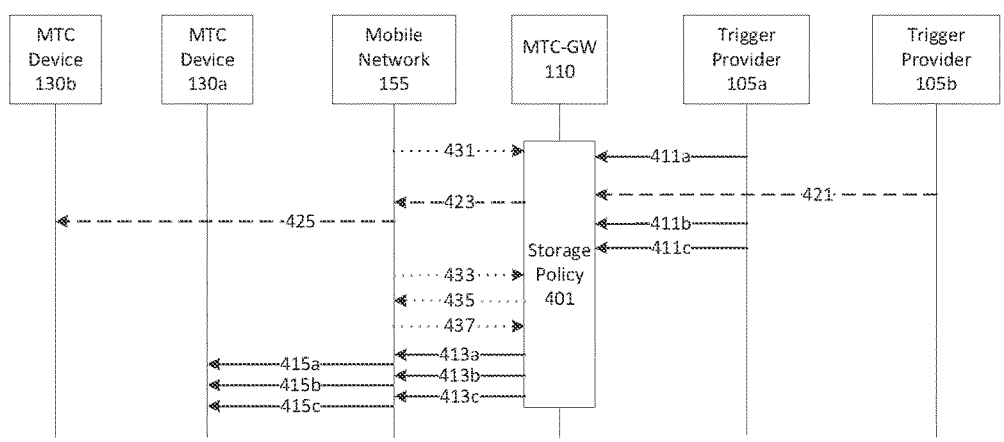
FIG. 4 depicts an exemplary schematic illustrating communication between a trigger provider and MTC device according to a store and forward policy.

FIG. 4. depicts an exemplary schematic illustrating communication between two devices, MTC device 130a and MTC device 130b, and two trigger providers, first trigger provider 105a and second trigger provider 105b, according to storage policy 401 imposed by centralized policy engine 204, consistent with disclosed embodiments. In step 431, MTC-GW 110 may receive an indication that the component of mobile network 155 serving MTC device 130b is over-utilized. In some aspects, MTC-GW 110 may receive an indication that the component has imposed an access restriction. For example MTC-GW 110 may receive an indication that the component has imposed Extended Access Barring, as described in Improvements for Machine-type Communications. This indication may be provided by mobile network 155. In response, storage policy 401 may be configured to restrict device trigger delivery to MTC device 130b. In steps 411a-411c, first trigger provider 105a may provide device triggers to MTC-GW 110. In accordance with storage policy 401, MTC-GW 110 may be configured to store these device triggers using trigger storage 205.

In step 433, as a non-limiting example, MTC-GW 110 may receive an indication that the component of mobile network 155 serving MTC device 130b is no longer overutilized. In some aspects, MTC-GW 110 may receive an indication that the access restriction has been withdrawn. For example, Extended Access Barring may no longer be in effect. This indication may be provided by mobile network 155. In response, MTC-GW 110 may be configured to modify storage policy 401 to permit delivery of device triggers at some rate to MTC device 130b. MTC-GW 110 may then dequeue the triggers from trigger storage 205 and provide them to mobile network 155 at the specified rate according to storage policy 401 in steps 413a-413c. Mobile network 155 may convey these triggers to MTC device 130a in steps 415a-415c.

Alternatively or additionally, in step 435, as a non-limiting example, MTC-GW 110 may provide information concerning the status of the queues. In certain aspects, MTC-GW 110 may be configured to provide the information to mobile network 155. In some aspects, MTC-GW 110 may provide the information to an enhanced HSS 201. In various aspects, MTC-GW may be configured to provide the information to an external HSS/HLR, Subscription Profile Repository, or User Data Repository. In response, in step 437, MTC-GW 110 may receive an indication that one or more of the device triggers may be delivered. For example, one or more components of mobile network 155 may indicate that the device triggers may be delivered. In some aspects, this indication may reflect a reconfiguration of the one or more components of mobile network 155 to handle the device triggers. As another example, one or more of enhanced HSS 201, the HSS/HLR, the Subscription Profile Repository, and the User Data Repository may provide an indication that the device triggers may be delivered, based on stored subscriber information and/or policies. In response, MTC-GW 110 may be configured to modify storage policy 401 to permit delivery of device triggers to MTC device 130. MTC-GW 110 may then dequeue the triggers from trigger storage 205 and provide them to mobile network 155 at according to storage policy 401 in steps 413a-413c. Mobile network 155 may convey these triggers to MTC device 130a in steps 415a-415c.

In step 421, second trigger provider 105b may provide a device trigger for MTC device 130a. In contrast to MTC device 130b, MTC device 130a may be served by one or more non-congested components of mobile network 155. Storage policy 401 may therefore not impose restrictions on delivering trigger devices to MTC device 130b. MTC-GW 110 may therefore be configured to convey the device trigger mobile network 155 in step 423. Mobile network 155 may be configured to provide the device trigger to MTC device 130b in step 425.

Figure 5:
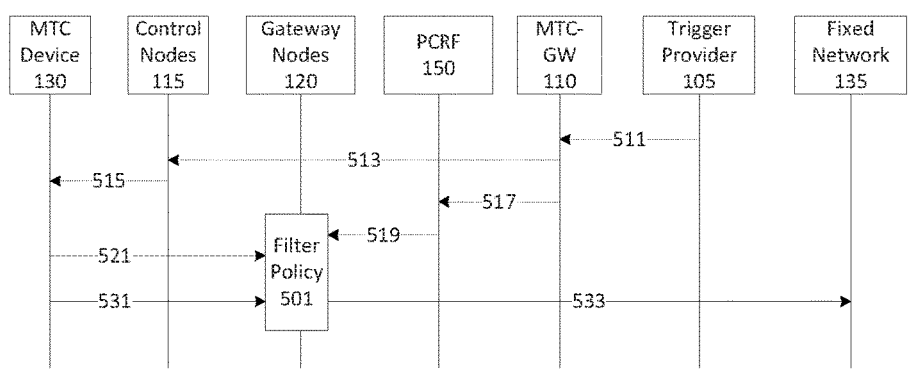
FIG. 5 depicts an exemplary schematic illustrating parameterized filtering of communications between a trigger provider and MTC device.

FIG. 5 depicts an exemplary schematic illustrating parameterized filtering of communications between trigger provider 105 and MTC device 130, consistent with disclosed embodiments. In some aspects, trigger provider 105 may be configured to provide a device trigger to MTC-GW 110 in step 511. In some embodiments, the device trigger may contain rules parameters regarding trigger provider 105, or another destination server (not shown) connected to fixed network 135. For example, the device trigger may include a URI or an IP address, quality of service restrictions, and similar information describing the intended connection between MTC device 130 and trigger provider 105 (or the destination server). In step 513, according to a rate policy imposed by centralized policy engine 204, MTC-GW 110 may be configured to provide the device trigger to control nodes 115. Control nodes 115 may be configured to provide the device trigger to MTC device 130, according to methods known to one of skill in the art.

MTC-GW 110 may also be configured to extract the rules parameters, consistent with disclosed embodiments. In step 517, MTC-GW 110 may be configured to communicate the rules parameters to a rules node. In some aspects, the rules node may be configured to construct parametrized flow control rules based in part on the received rules parameters. For example, MTC-GW 110 may be configured to communicate the rules parameters to PCRF 150. In step 519, the rules node may be configured to interact with one or more of the gateway nodes 120 to impose filter policy 501, as described in the 3GPP Specifications. Filter policy 501 may be configured to impose the derived flow control rules on the connection between MTC device 130 and fixed network 135. In some embodiments, the rules node may be configured to interact with an enforcement node installed on one or more of gateway nodes 120 to impose filter policy 501. For example, the rules node may be configured to interact with a Policy Charging and Enforcement Function (PCEF) installed on a PGW, as described in the 3GPP Specifications. In certain aspects, the rules node may be configured to interact with the enforcement node to associate rules with one or more contexts, bearers, or IP-CAN sessions.

Filter policy 501 may be parameterized based on the rules parameters extracted from the device trigger by MTC-GW, consistent with disclosed embodiments. For example, filter policy 501 may only permit MTC device 130 to connect to the IP address or URI provided in the device trigger. As an additional example, filter policy 501 may associate service data flows with rules, such as flow control rules and charging rules; notification triggers, such as usage thresholds and reporting criteria; and information identifying the application provider and/or trigger provider 105. These rules, notification triggers, and identifying information may be derived from rules parameters extracted from device triggers. In step 521, MTC device 130 may be configured to provide to one or more gateway nodes (through one or more control nodes 115 in some embodiments) a message that does not conform to filter policy 501. The one or more gateway nodes 120 maybe configured to discard the message. In step 531, MTC device 130 may be configured to provide to one or more gateway nodes (through one or more control nodes 115 in some embodiments) a message conforming to filter policy 501. In step 533, the one or more gateway nodes may be configured to provide this message to the fixed network 135 for delivery to trigger provider 105 (or the destination server).

Figure 6:
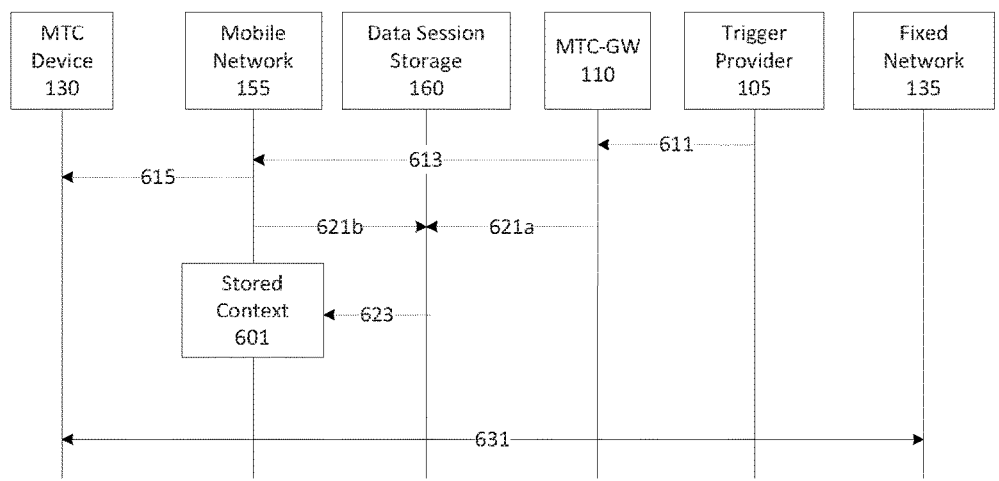
FIG. 6 depicts an exemplary schematic illustrating retrieval of stored bearer context.

FIG. 6 depicts an exemplary schematic illustrating retrieval of stored context 601, consistent with disclosed embodiments. Stored context 601 may comprise connection configuration information stored as data or instructions in a non-transitory memory of data session storage 160. Stored context 601 may be associated with MTC device 130. For example, stored context 601 may describe a connection for communicating between MTC device 130 and fixed network 135. In some embodiments, the stored context 601 may describe one or more IP-CAN bearers. For example, stored context 601 may describe previously established IP-CAN bearers, or may comprise templates for establishing IP-CAN bearers. Such IP-CAN bearers may comprise PDP context information for data sessions over a UMTS network, or network using similarly structured data sessions. Additionally or alternatively, such IP-CAN sessions may comprise EPS bearers for data sessions over a 3GPP LTE network, or network using similarly structured data sessions. Stored context 601 may include configuration information for one or more of an S5/S8 bearer, S1 bearer, or radio bearer. In some aspects, stored context 601 may include configuration information for one or more service data flows. In some embodiments, stored context 601 may comprise PCC rules associated with the one or more IP-CAN sessions. In certain embodiments, stored context 601 may comprise rule information associated with at least one component of the one or more IP-CAN sessions. Such rule information may include Policy and Charging Control rules, or information for generating Policy and Charging Control rules, as described in the 3GPP Specifications. For example, stored context 601 may comprise application session information associated with the one or more IP-CAN bearers. As an additional example, stored context 601 may comprise quality of service, charging, and flow control rules associated with service data flows carried over the one or more IP-CAN bearers. For example, stored context 601 may comprise one or more of an IP address for MTC device 130, subscriber information, gateway device information identifying the gateway node connecting to fixed network 135, traffic class, bit rate, delivery order, reliability, delay characteristics, priority, and similar characteristics and/or parameters of an IP-CAN connection known to one of skill in the art.

In step 611, trigger provider 105 may be configured to provide a device trigger to MTC-GW 110, consistent with disclosed embodiments. The device trigger may be configured to cause MTC device 130 to contact trigger provider 105 (or to contact another destination server specified in the device trigger) over fixed network 135. For example, trigger provider 105 may be configured to provide the device trigger to MTC-GW 110 through an SCS, or directly. MTC-GW 110 may store the device trigger, as described above with respect to FIG. 3, and may forward the device trigger to mobile network 155, according to policies imposed by centralized policy engine 204, in step 615. In certain embodiments, in step 621a, MTC-GW 110 may be configured to request a stored context from data session storage 160. In certain embodiments, in step 621b, one or more components of mobile network 155 may be configured to request a stored context from data session storage 160. For example, such components may be configured to contact data session storage 160 in response to receiving the device trigger from MTC-GW 110. In certain aspects, the request may include indexing information for retrieving the stored context from data session storage 160. For example, the request may include one or more of a MSISDN, IMSI, TIMSI, IP-CAN session ID, bearer ID, and service data flow id. Data session storage 160 may be configured to provide, in response to the one or more of requests of step 621a and 621b, stored context 601 corresponding to the provided indexing information in step 623. Mobile network 155 may be configured to create, or recreate, bearers for communication between MTC device 130 and trigger provider 105 (or a destination server) over fixed network 135. These bearers may be created, or recreated, based on the stored context 601 corresponding to the provided indexing information in step 623. Creating or recreating the bearers may comprise committing resources, such as memory, of one or more components of mobile network 155. For example, creating or recreating the bearers may comprise copying at least a portion of the stored context information into a memory of one or more components of mobile network 155. In step 631, MTC device 130 may communicate with trigger provider 105 (or a destination server) over fixed network 135 using the established bearers.

In some embodiments, one or more elements of system 100 may be configured with timers to determine the lifetime of the bearers established in mobile network 155 from the stored data session information received from data session storage 160. For example, the timers may be set to a predetermined value upon establishment of the bearers. Upon expiration of the timers, the bearers may be destroyed and any resources, such as memory, utilized by the bearers released. In some aspects, the different timers may correspond to different bearers. As a non-limiting example, a first timer may correspond to the S5/S8 bearer between the SGW and the PGW, while a second timer may correspond to the radio network bearers. The first and second timers may have different durations. In some aspects, timers associated with the radio bearers may have shorter timers than timers associated with other bearers. In some aspects, the values of the one or more timers may be stored in data session storage 160. In certain aspects, the values of the one or more timers may be provided by MTC-GW 110. For example the values of the one or more timers may be provided by centralized policy engine 204. In some embodiments, centralized policy engine 204 may be configured to adjust the timers based on status of network information received by MTC-GW 110. For example, centralized policy engine 204 may be configured to reduce the duration of the timers when the network approaches full capacity. In some aspects the timers may be inactivity timers, and the bearers may be destroyed after a specified period of inactivity.

In some embodiments, mobile network 155 may be configured to modify one or more of an IP-CAN session, EPS bearer, and service data flow. In certain aspects, mobile network 155 may be configured to modify one or more of the IP-CAN session, EPS bearer, and service data flow based on a request from MTC device 130. For example, MTC device 130 may be configured to request modification of one or more of traffic class, bit rate, delivery order, reliability, delay characteristics, priority, and similar characteristics and/or parameters of an IP-CAN connection known to one of skill in the art. In certain embodiments, mobile network 155 may be configured to update stored context 601 based on the modified one or more of the IP-CAN session, EPS bearer, and service data flow. For example, mobile network 155 may be configured to provide an updated context to data session storage 160.

Figure 7:
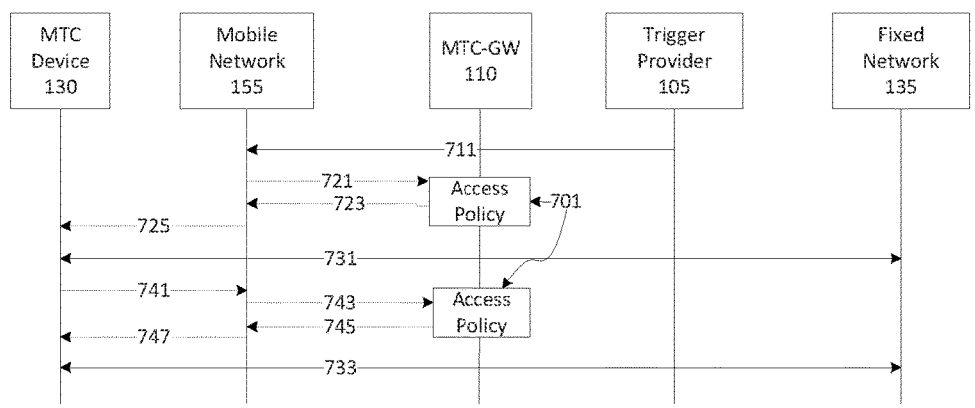
FIG. 7 depicts an exemplary schematic illustrating access control using an exemplary machine type communication gateway.

FIG. 7 depicts an exemplary schematic illustrating access control using an exemplary machine type communication gateway, such as MTC-GW 110, consistent with disclosed embodiments. In some embodiments, MTC-GW may be configured with a centralized policy engine 204, described above with regards to FIGS. 2 and 3, that imposes access policy 701. MTC-GW 110 may be configured to permit attempted communication between MTC device 130 and trigger provider 105 according to access policy 701.

Mobile network 155 may be configured to receive a downlink request from trigger provider 105 in step 711, consistent with disclosed embodiments. For example, trigger provider 105 may provide the downlink request, and/or an indication of the downlink request, through an established IP-CAN bearer to one or more components of mobile network 155. Trigger provider 105 may be configured to provide the downlink request, for example, to initiate a data session with MTC device 130. In step 721, mobile network 155 may be configured to provide a downlink data session request to MTC-GW 110. For example, one of control nodes 115 may be configured to provide the downlink data session request to MTC-GW 110.

MTC-GW 110 may be configured to evaluate the downlink data session request according to according to access policy 701, consistent with disclosed embodiments. In some embodiments, centralized policy engine 204 may be configured to impose access policy 701, as described above with regards to FIG. 2. In certain embodiments, access policy 701 may depend on device triggers received by MTC-GW 110. In certain aspects, MTC-GW 110 may be configured to authorize the downlink data session request based on prior receipt of a device trigger. As a non-limiting example, the received device trigger may include characteristics indicating that subsequent downlink requests should be authorized. These characteristics may indicate an origin, an intended use, an application, a sender, membership in a category of senders (e.g., content providers), that downlink requests would follow, or similar characteristics. In some aspects, MTC-GW may be configured to evaluate the downlink data session request based on a dataset generated from previously received device triggers.

MTC-GW 110 may be configured to provide authorization of the connection to one or more components of mobile network 155 in step 723. In response to the authorization, mobile network 155 may be configured to attach MTC device 130 to mobile network 155 according to methods known to one of skill in the art in step 725. MTC device 130 may then communicate with trigger provider 105 through fixed network 135 in step 731.

Mobile network 155 may be configured to receive an uplink request for trigger provider 105 (or different destination server) in step 741, consistent with disclosed embodiments. For example, MTC device 130 may provide the uplink request, and/or an indication of the uplink request to one or more components of mobile network 155. MTC device 130 may be configured to provide the uplink request, for example, to initiate a data session with trigger provider 105. In step 743, mobile network 155 may be configured to provide an uplink data session request to MTC-GW 110. For example, one of control nodes 115 may be configured to provide the uplink data session request to MTC-GW 110. As described above, with regards to uplink data session requests, MTC-GW 110 may be configured to evaluate the uplink data session request according to according to access policy 701. MTC-GW 110 may be configured to provide authorization of the connection to one or more components of mobile network 155 in step 745. In response to the authorization, mobile network 155 may be configured to attach MTC device 130 to mobile network 155 according to methods known to one of skill in the art in step 747. MTC device 130 may then communicate with trigger provider 105 through fixed network 135 in step 733.

Figure 8:
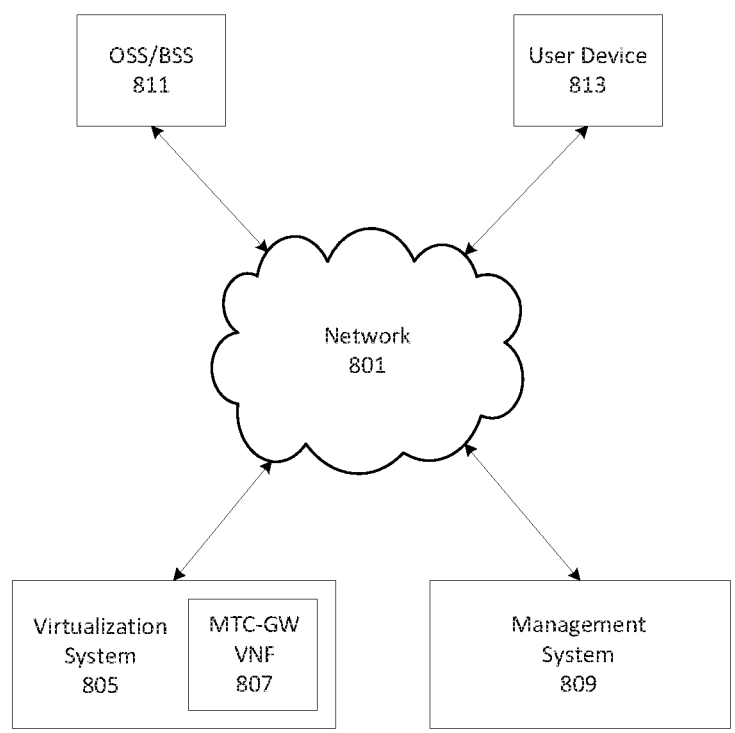
FIG. 8 depicts an exemplary realization of a machine-type communication gateway as a virtual network function.

FIG. 8 depicts an exemplary realization of a machine-type communication gateway, such as MTC-GW 110, consistent with disclosed embodiments. In some embodiments, MTC-GW 110 may be realized as one or more virtual network functions, such as MTC-GW VNF 807. In some embodiments, MTC-GW VNF 807 may be hosted on virtualization system 805. In certain aspects, MTC-GW VNF 807 may implement modules for common services, management services, storage services, transaction services, and de-multiplexing services. These services may together implement the tasks of MTC-GW VNF 807, such as handling communication between MTC-GW VNF 807 and other network entities, managing subscriber communications, and handling data packets received by MTC-GW VNF 807. Virtualization system 805 may be hosted on a cloud computing platform comprising at least one server according to methods known to one of skill in the art. Exemplary cloud computing platform may include OpenStack™ VMware®, and Titanium™, or similar systems, each of which may be configured to provide suitable platform services for virtualization system 805, as would be recognized by one of skill in the art.

Consistent with disclosed embodiments, MTC-GW 110 may comprise one or more instances of MTC-GW VNF 807, together with management system 809. In some embodiments, each instance of MTC-GW VNF 807, and management system 809, may comprise separate tenants on one or more cloud computing platforms. Management system 809 may comprise an enterprise management system (EMS), and may be configured to provide management interfaces for interacting with, controlling, and managing instances of MTC-GW VNF 807. Management system 809 may be configured to expose a web service interface for interactions with OSS/BSS 811 over network 801. OSS/BSS 811 may comprise an operation support system and business support system with such functionality and structure as would be recognized by one of skill in the art. Management system 809 may be configured to provide access to user devices, such as user device 813, through a web browser over network 801. User device may comprise a workstation, desktop, laptop, tablet, smartphone, or similar device capable of accessing management system 809 using a web browser. Network 810 may be any type of network (including infrastructure) that provides communications, exchanges information, and/or facilitates the exchange of information. For example, network 810 may comprise one or more Local Area Networks, Wide Area Networks, virtual networks that extend a private network over a public network, such as VPN, or other suitable connection(s).

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, or CD-ROM, or other forms of RAM or ROM. Accordingly, the disclosed embodiments are not limited to the above described examples, but instead is defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

The invention claimed is:

1. A system for managing machine-type communication, comprising
a machine-type communication gateway including a centralized policy engine and a device trigger storage, and comprising at least one processor and at least one non-transitory memory storing instructions for communicating with control nodes of a mobile network and trigger providers of a fixed network that, when executed by the at least one processor, cause the machine-type communication gateway to perform operations of:
receiving device triggers from the trigger providers,
storing the device triggers in the device trigger storage in queues, and
providing the device triggers to the control nodes at rates determined by the centralized policy engine.

2. The system of claim 1, wherein
storing the device triggers comprises storing first device triggers for a first region in a first queue, and
providing the device triggers comprises providing the first device triggers to control nodes for the first region at a first rate.

3. The system of claim 2, wherein the centralized policy engine adjusts the first rate based on status-of-network information concerning the first region, and/or a time of day.

4. The system of claim 3, wherein the status-of-network information comprises congestion information.

5. The system of claim 4, wherein the machine-type communication gateway receives the status-of-network information from the control nodes of the mobile network.

6. The system of claim 4, wherein the congestion information indicates increased congestion and the adjusted first rate comprises a reduced rate, or the congestion information indicates decreased congestion and the adjusted first rate comprises an increased rate.

7. The system of claim 2, wherein:
storing the device triggers further comprises storing second device triggers for the first region in a second queue;
providing the device triggers further comprises providing the second device triggers at a second rate;
a first priority of the first device triggers is greater than a second priority of the second device triggers; and
the first rate is greater than the second rate.

8. The system of claim 2, wherein the machine-type communication gateway stores additional instructions for communicating with a Home Subscriber Server, and the operations further comprise receiving first location information from the Home Subscriber Server and determining the first region based on the first location information.

9. The system of claim 8, wherein the first location information comprises one or more of a cell-id or network node identifier.

10. The system of claim 2, wherein the control nodes for the first region comprise one or more of C-SGN nodes, MSC nodes, MME nodes, and SGSN nodes, and the first region comprises a geographic area served by a Node B, eNodeB, or BTS.

11. The system of claim 1, the operations further comprising providing one or more of queue status information and device trigger status information to the mobile network.

12. The system of claim 1, wherein the device triggers are provided for delivery in SMS messages.

13. The system of claim 1, wherein the machine-type communication gateway provides the device triggers to the control nodes using one or more of an E, Gd, Gdd, SGd, T5a, T5b, T5c, T6a and T6b interface.

14. The system of claim 1, the operations further comprising receiving an indication of an access restriction from the mobile network, and wherein
receiving device triggers further comprises receiving a first device trigger for a first MTC device tolerant of access restrictions, the first device trigger having a first priority,
storing the device triggers further comprises storing the first device trigger based on the indication and the first priority, and
providing the device triggers further comprises providing the first device trigger following termination of the access restriction.

15. The system of claim 14, wherein the indication comprises an indication of Extended Access Barring.

16. The system of claim 1, wherein the machine-type communication gateway stores additional instructions for communicating with a rules node, and receiving device triggers further comprises receiving from a first trigger provider a first device trigger including rules parameters, and the operations further comprise:
extracting the rules parameters from the device triggers,
providing the rules parameters to the rules node to generate parameterized flow control rules for provision on a gateway node.

17. The system of claim 16, wherein the rules node comprises a Policy and Charging Rules Function.

18. The system of claim 1, wherein the operations further comprise:
receiving from one or more of the control nodes by the machine-type communication gateway a data session request for a first MTC device; and
authorizing the first MTC device to access the mobile network.

19. The system of claim 18, wherein the machine-type communication gateway stores additional instructions for communicating with a subscriber information node, and the operations further comprise:
receiving first MTC device information from the subscriber information node,
receiving status-of-network information from the mobile network, and
wherein authorization is based on the first MTC device information and the status-of-network information for the mobile network.

20. The system of claim 18, wherein authorization is based on previously received device triggers.

21. The system of claim 18, wherein the machine-type communication gateway stores additional instructions for communicating with a Home Subscriber Server.

22. The system of claim 1, wherein the machine-type communication gateway further includes a Service Capability Server or Service Capability Exposure Function that performs one or more of authentication, authorization, and encryption for communications between the machine-type communication gateway and the trigger providers, and the operations further comprise:
providing APIs for receiving application requests.

23. A system for mobile network memory conservation, comprising:
a mobile network that connects an MTC device to a Packet Data Network;

a machine-type communication gateway interworking between a first trigger provider and the mobile network; and a non-transitory storage memory that stores bearer information, and wherein the mobile network:

receives from the machine-type communication gateway an indication to establish a data session between the MTC device and one or more of the first trigger provider and a server, retrieves the stored bearer information from the storage memory, commits memory resources by establishing one or more bearers for the data session using the stored bearer information, and releases the memory resources by deleting the one or more bearers for the data session after completion of the data session.

24. The system of claim 23, wherein the indication to establish the data session comprises a device trigger.

25. The system of claim 23, wherein the mobile network updates the stored bearer information upon completion of the data session.

26. The system of claim 23, wherein the mobile network comprises a gateway node and committing the memory resources comprises copying at least a portion of the stored bearer information into a memory of the gateway node.

27. The system of claim 23, wherein the bearer information comprises one or more of at least one IP address for the MTC device, subscriber information, and gateway device information.

28. The system of claim 23, wherein the mobile network releases the memory resources following a specified period of inactivity.

* * * * *